United States Patent Office 3,546,166
Patented Dec. 8, 1970

3,546,166
THERMOSTABLE NITROGEN-CONTAINING RESINS CONTAINING AMIDE FUNCTIONS AND BENZIMIDAZOLE RINGS
Guy Rabilloud, Bernard Sillion, and Gabriel de Gaudemaris, Grenoble, France, assignors to Institut Francais du Petrole des Carburants et Lubrifiants, Rueil-Malmaison,, Hauts-de-Seine, France
No Drawing. Filed July 7, 1967, Ser. No. 651,670
Claims priority, application France, July 7, 1966, 68,652
Int. Cl. C08g 20/00
U.S. Cl. 260—47    15 Claims

ABSTRACT OF THE DISCLOSURE

Thermostable nitrogen-containing resins are prepared by reacting a diester of an aromatic diacid, a triester of an aromatic triacid, an aromatic diamine and an aromatic tetraamine to give polymers containing amide functions and benzimidazole groups. The resultant three-dimensional polymers are thermally stable and can be used as adhesives or as binding agents for laminates.

---

This invention relates to new thermostable nitrogen-containing resins based on polyamides and aromatic polybenzimidazoles, a process for manufacturing the same as well as the use of these resins as adhesives or binding agents for laminates.

According to this invention, a diester of an aromatic diacid, preferably a phenyl diester, and a triester of an aromatic triacid, preferably a phenyl triester, is reacted with an aromatic diamine and an aromatic tetraamine to create a new type of polymer containing both amide functions and benzimidazole groups.

The products obtained by this process exhibit an excellent thermal stability and lead to composite materials which retain at high temperature their mechanical characteristics which are higher, at high temperature, than those of the best known resins.

In forming the polymers of this invention, the diamine reacts with the diester and triester, respectively, to give the following recurring units:

—Y$_1$—CO—NH—Y$_3$—NH—CO—    (A)

>Y$_2$—CO—NH—Y$_3$—NH—CO—    (B)

Similarly, the tetramine reacts with the diester and the triester to give the following recurring units:

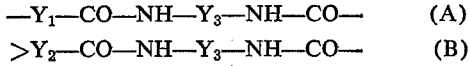
(C)

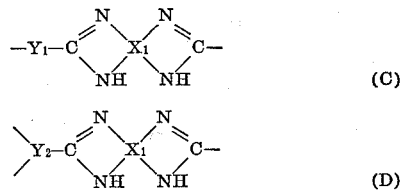
(D)

Y$_1$ is an aromatic or unsaturated heterocyclic divalent radical containing 4–18 carbon atoms, Y$_2$ is an aromatic or unsaturated heterocyclic trivalent radical containing 4–24 carbon atoms, Y$_3$ is selected from the same group as Y$_1$ and X$_1$ is a tetravalent aromatic or unsaturated heterocyclic radical containing 4–18 carbon atoms, whereby the 4-carbon atoms linked to the nitrogen atoms form two groups of two vicinal carbon atoms.

The polymers of the invention are therefore characterized by the simultaneous presence of the four aforementioned types of recurring units. It can be seen from the presence of the units (B) or (D) that these novel polymers are three-dimensional or reticulated.

The manufacture of the polymer is carried out preferably by reacting the aromatic amines in a predetermined order: the diamines in a first step and the tetraamines in a second step. The esters may be used either simultaneously or separately and in that case it is preferable to react the diester initially, and then the triester. It is however to be noted that a simple process, leading to a resin which is convenient for the manufacture of laminates, has been used preferably in most of the cases. According to this process, the synthesis of the polymer is carried out in 3 steps.

In a first step, a mixture of an aromatic diacid, preferably the phenyl diester, with a triester of an aromatic triacid, preferably the phenyl triester, is reacted with an aromatic diamine, taking care that an excess of ester functions be present with respect to the amine functions, and operating preferably above 100° C.

Although it is preferred to conduct the above condensation in the absence of solvent at such a temperature that the reactants are melted and react easily therebetween it is also possible to work in a solvent, for example, a polar inert solvent. Solvents of high boiling point are then preferred.

When the reaction is carried out with melted reactants, the temperature is advantageously chosen between 150° and 300° C. and it will be preferably chosen between 200 and 280° C. to speed up the formation of the intermediary product.

When a solvent is used, temperatures between 120 and 250° C. are preferred.

The product which has been formed in the first step is admixed with the aromatic tetraamine, preferably used in stoichiometric amount corresponding to the available ester functions, the stoichiometry being of one ester function for two amine functions of the tetraamine. This mixture is heated up to such a temperature that the polycondensation may proceed easily, usually above 100° C.

This second step may be carried out by melting the reactants at a temperature preferably comprised between 150 and 300° C. or by heating in the presence of an organic solvent, preferably of the polar type, at a temperature preferably comprised between 110 and 250° C. As a rule the temperatures comprised between 100 and 300° C. are advantageous.

In this second step, the mixture of reactants gives a composition having an inherent viscosity comprised between 0.03 and 0.20 (as measured at 30° C. for a concentration of 0.5% by weight of polymer in N-methyl pyrrolidone), and a softening temperature lower than 400° C. Such a result is obtained faster and faster as the temperature rises. Taking this into account, the reaction times are usually comprised between 5 minutes and several hours.

At this stage, the composition has a low polymerization degree and is quite convenient for the manufacture of laminates. As a matter of fact, when the resin is used therefor, it seems desirable to avoid an excess of polymerization, and an inherent viscosity between 0.05 and 0.10 is quite convenient.

During the last step, the composition is dissolved, if it was not before, in an organic solvent, preferably of the polar type, before it is admixed with the solid reinforcing materials. The desirable concentrations of resin in impregnating solution is usually comprised between 5 and 70% by weight, preferably between 25 and 50%. After the solvent has been evaporated, the impregnated elements are applied one on the other, the tight contact, so as to obtain a laminate which is treated when hot, temperature preferably higher than 300° C. and comprised for example between 310 and 400° C., under a sufficient pressure to have the elements strongly stuck therebetween.

This operation is usually carried out in two or three successive steps, first at a moderate temperature with or without pressure, then at high temperature under strong pressure. After cooling, the laminate is advantageously submitted to a reheating treatment, preferably under vacuum, for example, for 24 hours at 250° C., 24 hours at 300° C., 24 hours at 350° C. and eventually 8 or 10 hours at 400° C. Samples are then cut in the laminate to determine the mechanical characteristics of the material (see Table I).

The solvents which may be used to practice the invention, either in the first step reaction or in the second step reaction, or even to impregnate, are quite numerous. Advantageously any polar organic solvent may be used which is substantially inert towards the reactants. For example, it is possible to use dimethylsulfoxide, N-methyl pyrrolidone, dimethylacetamide, hexamethylphosphoramide, meta-cresol, chlorophenol, or pyridine. By polar organic solvent is meant any liquid the molecule of which contains carbon, hydrogen and at least one other non-metallic element, for example, O, S, N, or P.

The relative proportions of the reactants may vary broadly, provided there is preferably a number of ester functions which is the same as the total number of amine functions (from the diamines) and orthodiamine functions. Thus for one mole of aromatic tetraamine, from 0.1 to 8 moles of aromatic diamine may be used, as well as 2.2 to 20 molar functions of ester conveniently derived from the diester and the triester.

Preferably for one part by weight of diesters there is used 0.01 to 1 part by weight of triester.

The following raw materials may be used by way of examples.

(I) DIESTERS

The diesters are preferably of the formula $$R_1OOC—Y_1—COOR_2$$

where $R_1$ and $R_2$ are hydrocarbon monovalent radicals, particularly alkyl or alkenyl of 1–18 carbon atoms, cycloalkyl or cycloalkenyl of 5–18 carbon atoms, aryl of 6–18 carbon atoms or aralkyl of 7–18 carbon atoms, and $Y_1$ is a divalent aromatic or unsaturated heterocyclic radical, preferably containing 4–18 carbon atoms.

As examples of $R_1$ and $R_2$, the following are to be named: methyl, ethyl, n-heptyl, n-decyl, isopropyl, isooctyl, allyl, cyclohexyl, cyclohexenyl, cyclooctyl, methyl-4-cyclohexyl, phenyl, tolyl, xylyl, benzyl, naphthyl.

As examples of $Y_1$, the divalent radicals derived from the following compounds may be named: benzene, toluene, xylene, ethylbenzene, naphthalene, diphenyl, diphenyloxide, diphenylsulfide, diphenylsulfone, diphenylmethane, benzophenone, pyridine, pyrazine, thiophene, furan, quinoline, 1,3,4-oxadiazole, 1,3,4-thiodiazole.

As specific examples, there may be named the methyl, m-pentyl, phenyl, cyclohexyl or benzyl diesters of the following acids: o-phthalic, isophthalic, terephthalic, 2,5-pyridine dicarboxylic, 2,6-pyridine dicarboxylic, 3,5-pyridine dicarboxylic, 1,4-naphthalene dicarboxylic, 1,6-naphthalene dicarboxylic, 2,6-naphthalene dicarboxylic, 2,5-pyrazine dicarboxylic, 2,5-furan dicarboxylic, 2,6-quinoline dicarboxylic, 2,5-thiophene dicarboxylic, 4,4'-biphenyl dicarboxylic, 4,4'-diphenylether dicarboxylic, 4,4'-diphenylmethane dicarboxylic, 3,3'-diphenylsulfide dicarboxylic, 4,4'-benzophenone dicarboxylic, 3,3'-diphenylsulfone dicarboxylic.

(2) TRIESTERS

The triesters are of the formula:

$$R_3OOC—Y_2—COOR_4$$
$$|$$
$$COOR_5$$

where $R_3$ to $R_5$ are the same as $R_1$ and $R_2$ and the above examples of $R_1$ and $R_2$ are also applicable for $R_3$ to $R_5$.

$Y_2$ is a trivalent aromatic or unsaturated heterocyclic radical, preferably containing 4–24 carbon atoms.

As examples of $Y_2$, there will be mentioned trivalent radicals derived from the aromatic compounds described hereabove for $Y_1$.

As specific examples, the ethyl, phenyl, cyclohexyl and benzyl triesters of the following acids may be named: 1,3,5-benzenetricarboxylic acid, 2,4,6-pyridine tricarboxylic acid, 2,4,3'-diphenyltricarboxylic acid, 1,6-dimethyl-2,4,7-naphthalene tricarboxylic acid, 3,4,9-perylene tricarboxylic acid, 4,4',4''-triphenylmethane tricarboxylic acid, 4',4'',4'''-tricarboxy-1,3,5-triphenylbenzene, 2,4,4'-diphenylmethane tricarboxylic acid, 3,5,4'-diphenyloxide tricarboxylic acid, 2,4,3'-benzophenone tricarboxylic acid.

(3) DIAMINES

The diamines are represented by the formula:

$$H_2N—Y_3—NH_2$$

where $Y_3$ is chosen from the same group as $Y_1$, or preferably by the formula:

$$H_2N—Ar_1—Z_1—(—Ar_3—Z_2—)_n—Ar_2—NH_2$$

where $Z_1$ and $Z_2$ are —CONH— or —NHCO— groups, $Ar_1$, $Ar_2$ and $Ar_3$ are radicals selected from the same group as radicals $Y_1$ and $Y_3$ and $n$ is zero or an integer, preferably 1 to 3.

By way of examples, the following are to be named:

orthophenylenediamine,
metaphenylenediamine,
paraphenylenediamine,
2,5-diaminopyridine,
2,6-diaminopyridine,
3,5-diaminopyridine,
2,4-diaminopyrimidine,
2,5-diaminopyrimidine,
2,6-diaminopyrazine,
benzidine,
3,3'-diaminobiphenyl,
4,4'-diaminodiphenylmethane,
4,4'-diaminobenzophenone,
3,3'-diaminobenzophenone,
4,4'-diaminodiphenylether,
1,5-diaminonaphthalene,
4,4'-diaminodiphenylsulfide,
4,4'-diaminodiphenylsulfone,
3,3'-diaminobenzanilide,
3,4'-diaminobenzanilide,
4,4'-diaminobenzanilide,
4,3'-diaminobenzanilide,
N,N'-bis(p-aminobenzoyl)metaphenylene diamine,
N,N'-bis(m-aminobenzoyl)paraphenylene diamine,
N,N'-bis(m-aminobenzoyl)-4,4'-diaminodiphenylether,
N,N'-bis(m-aminobenzoyl)-4,4'-diaminodiphenylmethane,
N,N'-bis(m-aminobenzoyl)-4,4'-diaminodiphenylsulfone,
N,N'-bis(4-p-aminophenoxybenzoyl)metaphenylenediamine,
N,N'-bis(4-p-aminophenoxybenzoyl)paraphenylenediamine,
N,N'-bis(4-p-aminophenoxybenzoyl)-4',4''-diaminodiphenylether,
N,N'-bis(4-p-aminophenoxybenzoyl)-4',4''-diaminodiphenylmethane,
N,N'-bis(4-p-aminophenoxybenzoyl)-3,5-diaminopyridine,
N,N'-bis(m-aminobenzoyl)-3,3'-diaminobenzanilide,
N,N'-bis(p-aminobenzoyl)-3,3'-diaminobenzanilide,
N,N'-bis(m-aminobenzoyl)-3,4'-diaminobenzanilide,
N,N'-bis(m-aminobenzoyl)-4,3'-diaminobenzanilide,
N,N'-bis(m-aminobenzoyl)-4,4'-diaminobenzanilide,
N,N'-bis(4-p-aminophenoxybenzoyl)-3,3'-diaminobenzanilide,
N,N'-bis(3-aminophenyl)isophthalamide and
N,N'-bis(3'-aminobenzamido-3-phenyl)isophthalamide.

(4) TETRAAMINES

These compounds answer to the following general formula:

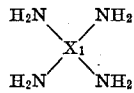

where $X_1$ is a tetravalent aromatic or unsaturated heterocyclic radical, preferably containing 4–18 carbon atoms, whereof the 4 carbon atoms linked with the nitrogen atoms constitute two groups of two vicinal carbon atoms.

As aromatic compounds which are able to bear 4 free valences and constitute an $X_1$ radical, the following are to be named: benzene, toluene, para-xylene, ethylbenzene, naphthalene, diphenyl, diphenylmethane, diphenylsulfide, benzophenone, diphenyloxide, diphenylsulfone, pyridine, pyrazine, thiophene and furan.

The aromatic tetraamines which may be used have two reactive o-diamino centers, which may find place: —either on the same nucleus, as 1,2,4,5-tetraaminobenzene, 2,3,5,6-tetraaminotoluene, 2,3,5,6-tetraaminoxylene. —or on two condensed nuclei, as for example 1,2,5,6-tetraminonaphthalene, or 2,3,6,7-tetraaminonaphthalene. —or on two different rings, as for example 3,3'-diaminobenzidine, 3,3',4,4'-tetraaminodiphenylmethane, 3,3',4,4'-tetraaminodiphenylsulfone, 3,3',4,4'-tetraaminobenzophenone, 3,3',4,4'-tetradiphenylsulfide, 3,3',4,4'-tetraaminodiphenyloxide, —or finally on heterocycles, as for example 2,3,5,6-tetraaminopyridine, 2,3,5,6-tetraaminopyrazine, 2,3,4,5-tetraaminothiophene and 2,3,4,5-tetraaminofuran.

All these compounds may of course be used either alone or as mixtures therebetween.

EXAMPLE 1

9.54 g. (0.03 mole) of phenyl isophthalate and 1.08 g. (0.01 mole) of metaphenylenediamine are admixed under an inert atmosphere. These reactants are melted and heated to 250° C. for 1 hour and 30 minutes. At the end of the reaction, the resulting product is dissolved into 15 ml. of dimethylsulfoxide and 4.708 g. (0.022 mole) of 3,3'-diaminobenzidine are added thereto. The solution is maintained at reflux for 1 hour and 0.58 g. of phenyl trimesate are added thereafter. The heating to reflux is maintained for 20 more minutes after this addition. The obtained resin is applied on a glass cloth, and the mechanical characteristics of the laminate manufactured with this cloth are pointed out in Table 1.

EXAMPLE 2

A resin of analogous type is manufactured from 6.36 g. phenyl isophthalate (0.02 mole); 2 g. (0.01 mole) bis(amino-4 phenyl) ether, 2.354 g. (0.011 mole) 3,3'-diaminobenzidine and 0.29 g. (2/3 mmole) phenyl trimesate. This resin is also used to manufacture a laminate (Table 1).

EXAMPLE 3

There is admixed under inert atmosphere 6.36 g. (0.02 mole) of phenyl isophthalate, 2.92 g. (6.66 mmoles) of phenyl trimesate and 4.54 g. (0.02 mole) of 3,3'-diaminobenzanilide. This mixture is heated to 260° C. for 2 hours and 30 minutes. The reaction product is then dissolved in 15 ml. of a mixture of equal parts of pyridine and dimethylsulfoxide.

2.14 g. (0.01 mole) of 3,3'-diaminobenzidine are added to the above solution which is thereafter heated to 220° C. in a metallic bath. After 45 minutes at this temperature, the resin is sprayed on a glass cloth (Table 1).

EXAMPLE 4

There is prepared a resin similar to the resin described in Example 3, except that the solvent used at the end of the first step is a mixture of 25 parts of dimethylsulfoxide with 75 parts of pyridine.

The mechanical characteristics of the resulting laminate are given in Table 1.

EXAMPLES 5 AND 6

There is prepared a resin similar to that of Example 3, except that the solvent used at the end of the first step is N-methyl pyrrolidone (Example 5) or pyridine (Example 6). The results are given in Table 1.

EXAMPLE 7

There is prepared a resin, in the operating conditions given for Example 3, from 0.04 mole phenyl isophthalate, $4/3.10^{-2}$ mole phenyl trimesate, 0.04 mole 4,3'-diaminobenzanilide and 0.02 mole 3,3'-diaminobenzidine. The solvent used at the end of the first step is N-methylpyrrolidone.

EXAMPLE 8

There is prepared a resin similar to that of Example 7, except that the solvent used at the end of the first step is pyridine.

EXAMPLE 9

There is admixed under an inert atmosphere 6.36 g. phenyl isophthalate, 2.92 g. phenyl trimesate and 4.54 g. 3,3'-diaminobenzanilide. This mixture is maintained at 260° C. for 2 hours and 30 minutes. At the end of the reaction, 2.14 g. of 3,3'-diaminobenzidine and 0.2 g. of antioxidant ("Ionox 220" from Shell) are added and the melted mixture is maintained at 230° C. for 30 minutes. At the end of this reaction, the resin is dissolved in 15 ml. of N-methylpyrrolidone and sprayed on a glass cloth to manufacture a laminate (Table 1)

EXAMPLE 10

A resin similar to that of Example 9 is manufactured except that 3,3'-diaminobenzanilide is replaced by 4,3'-diaminobenzanilide. In that case, the reaction, carried out in the fused state, lasts 15 minutes at 230° C. (Table 1).

EXAMPLE 11

A resin similar to that of Example 3 is manufactured from 0.03 mole phenyl isophthalate, 0.01 mole phenyl terephthalate, 0.0133 mole phenyl trimesate, 0.04 mole 3,3'-diaminobenzanilide and 0.02 mole 3,3'-diaminobenzidine (Table 1). The solvent is N-methylpyrrolidone.

EXAMPLE 12

A resin is prepared in the experimental conditions of Example 3 from 0.25 mole phenyl isophthalate, 0.033 mole 1,3,5-triphenylbenzene tri(phenyl carboxylate), 0.066 mole phenyl trimesate, 0.30 mole 3,3'-diaminobenzanilide and 0.1 mole 3,3'-diaminobenzidine (Table 1).

EXAMPLE 13

9.54 g. (30 mmoles) of phenyl isophthalate, 4.38 g. (20 mmoles) of phenyl trimesate and 6.92 g. (20 mmoles) of N,N'-bis(3-aminophenyl) isophthalamide are reacted at 260° C. for 2 hours and 45 minutes. At the end of the reaction, the mixture is dissolved in 20 ml. of dimethylsulfoxide and 5.35 g. (25 mmoles) of 3,3'-diaminobenzidine and 400 mg. of a phenolic antioxidant are added thereto. The second step reaction takes 1 hour and 40 minutes in a bath at 220° C.

EXAMPLE 14

The manufacture of the polyamide at 260° C. for 3 hours makes use of the following reactants: 9.54 g. (30 mmoles) of phenyl isophthalate, 4.38 g. (10 mmoles) of phenyl trimesate, 6.92 g. (20 mmoles) of 3,3'-diamino benzanilide and 5.84 g. (10 mmoles) of N,N'-bis(3'-amino-3-benzamidophenyl) isophthalamide. This mixture is, after reaction, dissolved into 30 ml. of dimethylsulfoxide together with 3.21 g. (15 mmoles) of 3,3'-diaminobenzidine. The reaction with the latter reactant takes 1 hour and 30 minutes at 220° C.

EXAMPLE 15

There is admixed under an inert atmosphere 6.36 g. of phenyl isophthalate, 2.92 g. of phenyl trimesate and 4 g. of 4,4'-diaminodiphenylether and these are reacted at 250° C. for 2 hours and 30 minutes. The reaction mixture is dissolved in 15 ml. of pyridine and the polycondensation is carried out with the addition of 2.14 g. of 3,3'-diaminobenzidine and with heating at reflux of pyridine for 50 minutes.

EXAMPLE 16

12.72 g. of phenyl isophthalate, 5.84 g. of phenyl trimesate, 9.08 g. of 3,3'-diaminobenzanilide and 400 mg. of antioxidant are reacted at 260° C. for 3 hours and 30 minutes. After dissolution of the reaction products in 30 ml. of pyridine, 4.28 g. of 3,3'-diaminobenzidine are added and the solution is refluxed for 3 hours and 30 minutes.

EXAMPLE 17

6.36 g. (20 mmoles) of phenyl isophthalate, 4.38 g. (10 mmoles) of phenyl trimesate and 2.27 g. (10 mmoles) of 3,3'-diaminobenzanilide are heated for 3 hours at 260° C. The reaction product is dissolved in 15 ml. of pyridine and reacted with 3.21 g. of 3,3'-diaminobenzidine at reflux for 2 hours and 30 minutes.

EXAMPLE 18

A resin is prepared by reacting, in a first step, 9.54 g. (30 mmoles) of phenyl isophthalate, 4.38 g. (10 mmoles) of phenyl trimesate and 4.54 g. (20 mmoles) of 3,3'-diaminobenzanilide at 260° C. for 3 hours and 30 minutes. The reaction product is dissolved in 20 ml. of pyridine and reacted with 5.35 g. (25 mmoles) of 3,3'-diaminobenzidine at reflux for 4 hours.

EXAMPLE 19

The solutions of the prepolymers prepared in examples 1 to 18 are used to impregnate a glass cloth. The solvent is evaporated under reduced pressure or in a gas stream at a temperature between 40 and 150° C. The impregnated cloth is cut into identical elements which are applied in tight contact, one on the other to obtain a laminate which is treated when hot under sufficient pressure in order that the elements may adhere one to the other.

The pressing conditions given in Table I are the following:

(A) The laminate is placed between the plates of a press heated to 135° C., the plates being placed in mere contact with the material without pressure for about 15 to 20 minutes. A pressure of 14 to 15 kg./cm.$^2$ is applied thereafter and the temperature is progressively raised to 300° C. (1.5° C. per minute). When the temperature attains 330° C., it is maintained for 4 hours whereas the pressure remains applied. The temperature is then lowered to 120° C., whereas the pressure of 15 kg./cm.$^2$ remains applied to the end of the treatment. The laminate is then recovered and cut into samples which are used to determine the mechanical characteristics of the composite material.

(B) The general proceeding is the same as before, except that the treatment at high temperature is maintained for 1 hour at 330° C., 1 hour at 350° C. and 1 hour at 370° C.

After cooling the laminate which must be used at high temperature are preferably submitted to a reheating treatment under vacuum or an inert atmosphere, for example, for 24 hours at 250° C., 24 hours at 300° C., 24 hours at 325° C., 24 hours at 350° C. and 10 to 20 hours at 370° C.

The mechanical properties of the laminates are given in Tables I, II and III.

TABLE I

Mechanical properties of the laminates at normal temperature and after ageing in the air at 300° C.

| Resin example | Viscosity [1] | Conditions of pressing | Breaking charge [2] | Conditions of the trial in air |
|---|---|---|---|---|
| 1 | | A | 54–55 | Normal temperature. |
| 2 | | A | 60–62 | Do. |
| 3 | 0.10 | A | 61–65 | Do. |
| | | | 45–48 | After 50 h. at 300° C. |
| 4 | 0.072 | A | 51–53 | Normal temperature. |
| | | | 42–44 | After 50 h. at 300° C. |
| 5 | 0.070 | A | 55–57 | Normal temperature. |
| | | | 54–55 | After 50 h. at 300° C. |
| 6 | 0.085 | A | 56–58 | Normal temperature. |
| | | | 59–61 | After 50 h. at 300° C. |
| | | | 45–46 | After 100 h. at 300° C. |
| 7 | 0.14 | A | 47–48 | Normal temperature. |
| | | | 37–38 | After 50 h. at 300° C. |
| 8 | 0.13 | A | 61–63 | Normal temperature. |
| | | | 43–44 | After 50 h. at 300° C. |
| 9 | 0.076 | A | 57–59 | Normal temperature. |
| | | | 45–46 | After 50 h. at 300° C. |
| 10 | 0.13 | A | 46–53 | Normal temperature. |
| | | | 36–37 | After 50 h. at 300° C. |
| 11 | 0.112 | B | 59–60 | Normal temperature. |
| | | | 46–48 | After 50 h. at 300° C. |
| 12 | 0.103 | B | 55–56 | Normal temperature. |
| | | | 45–46 | After 50 h. at 300° C. |
| 13 | | B | 52–55 | Normal temperature. |
| 14 | | B | 48–52 | Do. |
| 15 | | B | 50–55 | Do. |
| 16 | 0.098 | B | 54–56 | Do. |
| 17 | 0.064 | B | 49–50 | Do. |
| 18 | 0.060 | B | 49–52 | Do. |

[1] Inherent viscosity in pyridine at 30° C. for a concentration of 0.5% by weight of prepolymer.
[2] Breaking charge in kg./mm.$^2$

TABLE II

Mechanical properties of the laminates at high temperature.

| | Breaking charge [1] at temperatures of— | | | |
|---|---|---|---|---|
| | 250° C. | 300° C. | 350° C. | 400° C |
| Resin of Example: | | | | |
| 6 | 50–54 | 55–60 | 35–38 | 23–27 |
| 16 | 50–53 | 45–53 | 45–49 | 29–31 |
| 18 | 49–52 | 48–51 | 29–50 | 30–34 |

[1] Breaking charge in kg./mm.$^2$

TABLE III

Resistance to oxidation of a laminate manufactured from the resin of Example 16 and maintained at 250° C. in the air.

| | Breaking charge [1] after aging at 250° C. in the air, measures— | |
|---|---|---|
| | At normal temperature | At 250° C. |
| Ageing time in hours: | | |
| 0 | 52–57 | 50–52 |
| 250 | 53–57 | 50–52 |
| 500 | 49–50 | 38–49 |
| 1,000 | 39–42 | 36–38 |
| 2,000 | 20–24 | |

[1] Breaking charge in kg./mm.$^2$

The resins of this invention may also be used as adhesives to stick materials of any nature, particularly metals, for example, aluminum, stainless steel or titanium.

It is preferred to manufacture the resin in 2 steps, while distilling the liberated alcohol or phenol as long as it is formed. Thus about 95 to 98% of this alcohol or phenol, with respect to the stoichiometric amount, are withdrawn. The resulting resin may be crushed and stored.

The solution of little polymerized resins, containing preferably 25 to 50% by weight of resin (more usually 10 to 70%), may be used to stick materials as described in ASTM standard method D–1002–53T.

The solution of the resin may be used as such or in admixture with materials favoring adhesivity and increasing the resistance to oxidation at high temperature. As an example of a substance of the first type, well degreased and very fine aluminum powder will be mentioned (particles preferably lower than 40 microns), for example in the range of 5 to 200% of the weight of resin (preferably 20 to 100%). As an example of a substance of the second group, arsenic thioarseniate will be mentioned, used in an amount of 2 to 50% (preferably 10 to 30%) with respect to the weight of resin.

The resin which has been preferably charged may be deposited on the surfaces to be stuck either directly or from a glass cloth previously impregnated with the resin. The weight of resin is about 30 to 130% of the weight of the impregnated cloth (preferably 60 to 90%).

The following examples are illustrative of this process:

EXAMPLE 20

477 g. (1.5 mole) of phenyl isophthalate, 219 g. (0.5 mole) of phenyl trimesate, 227 g. (1 mole) of 3,3'-diaminobenzanilide and 9.75 g. of antioxidant (Ionox 330 Shell) are admixed in a glass vessel provided with efficient agitating means, under an inert atmosphere. These reactants are fused, then heated to 250° C. for 6 hours. The phenol is distilled as long as it is formed. 97% of the theoretical phenol are obtained.

The resulting product is dissolved in 560 ccm. of pyridine. 267.5 g. (1.25 mole) of diaminobenzidine are added, then the mixture is refluxed for 5 hours. After cooling, the mixture is diluted to 50% by weight. The inherent viscosity at this stage is 0.13 (0.5% at 30° C. in N-methylpyrrolidone).

EXAMPLE 21

With the solution of prepolymer manufactured in Example 20, stainless steel samples Z10CNT18 are bonded according to ASTM method D1002–53T. The surfaces to be bonded are previously degreased according to known methods, then painted with a first layer of resin, dried for 10 minutes at 100° C. A second layer is deposited and the product is finally dried at 100° C. for 1 hour.

The samples are heated for 1 hour at 330° C. and 7 kg./cm.² then reheated for 20 hours at 300° C. and 5 hours at 350° C. under vacuum.

EXAMPLE 22

Working is carried out as described in Example 21; however after deposit of the 2 layers, a piece of glass cloth, type 112—112, impregnated to 80% by resin, is placed between the surfaces to be bonded.

EXAMPLE 23

Working is carried out as described in Example 22, except that the resin is charged, in an amount of 80% with respect to the resin, with aluminum powder; the mixture is made in a mixer.

EXAMPLE 24

The process is carried out in Examples 22 and 23, except that the resin is charged, in addition to the aluminum powder, with 20% by weight of arsenic thioarseniate which is an inhibiter of the oxidizing degradation of the resin at high temperature.

EXAMPLE 25

Example 20 is repeated, except that 15% of the weight of isophthalate are replaced by the same weight of phenyl terephthalate.

The inherent viscosity (0.5% at 30° C.) in pyridine is 0.049.

The following results have been obtained with respect to the rupture strength (kg. force/mm.²).

|  | Examples | | | | |
|---|---|---|---|---|---|
|  | 21 | 22 | 23 | 24 | 25 |
| At normal temperature | 1.9 | 2.2 | 2.5 | 2.5 | 2.6 |
| At 300° C. (after 100 hours heating at this temperature) | 0 | 0 | 0 | 1.2 | 1.6 |

We claim:
1. A process for the preparation of thermostable nitrogen-containing resins which comprises reacting (1) a diester having the formula $R_1OOC—Y_1—COOR_2$ and (2) a triester having the formula

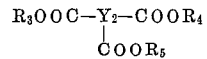

with (3) a diamine having the formula $$H_2N—Y_3—NH_2$$

or $$H_2N—Ar_1—Z_1(Ar_3—Z_2)_nAr_2—NH_2$$

and (4) a tetraamine having the formula

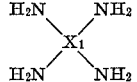

wherein $Y_1$ is an aromatic divalent radical containing 4–18 carbon atoms, $Y_2$ is an aromatic trivalent radical containing 4–24 carbon atoms, $Y_3$ is selected from the same group as $Y_1$, $X_1$ is a tetravalent aromatic radical containing 4–18 carbon atoms, the four carbon atoms linked with the nitrogen atoms forming two groups of two vicinal carbon atoms, $R_1$, $R_2$, $R_3$, $R_4$ and $R_5$ are monovalent hydrocarbon radicals, each containing 1–18 carbon atoms, $Z_1$ and $Z_2$ are CONH or NHCO groups, $Ar_1$, $Ar_2$ and $Ar_3$ are each selected from the same group as $Y_1$ and $n$ is zero or an integer from 1 to 3, at a temperature between 100° C. and 300° C., the amount of reactants employed being from 0.1 to 8 moles of diamine and a total of 2.2 to 20 equivalents of ester groups per 1 mole of tetraamine.

2. A process according to claim 1, wherein the amount of triester employed is 0.01 to 1 part by weight per 1 part by weight of diester.

3. A process according to claim 1, wherein said diester is a phenyl diester of an aromatic diacid and said triester is a phenyl triester of an aromatic triacid.

4. A process according to claim 1, wherein said diester is phenyl isophthalate and said triester is phenyl trimesate.

5. A process according to claim 1, wherein said diester is phenyl isophthalate, said triester is phenyl trimesate, said diamine is 3,3'-diaminobenzanilide and said tetraamne is 3,3'-diaminobenzidine.

6. A process for the preparaton of thermostable nitrogen containing resins which comprises reacting (1) a diester having the formula $R_1OOC—Y_1—COOR_2$ or a mixture of said diester and (2) a triester having the formula

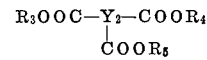

with a diamine having the formula $$H_2N—Y_3—NH_2$$

or $$H_2N—Ar_1—Z_1(Ar_3—Z_2)_nAr_2—NH_2$$

at a temperature of from 100° C. to 300° C. to form a reaction mixture which is soluble in an organic solvent; then reacting a tetraamine having the formula

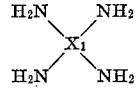

with said reaction mixture at a temperature of from 100° C. to 300° C. to form a product having a viscosity of from 0.03 to 0.2 measured at 30° C. for a 0.5% by weight solution of the polymer in N-methyl pyrrolidone and a softening temperature of less than 400° C., wherein $Y_1$ is an aromatic divalent radical containing 4–18 carbon atoms, $Y_2$ is an aromatic trivalent radical containing 4–24 carbon atoms, $Y_3$ is selected from the same group as $Y_1$, $X_1$ is a tetravalent aromatic radical containing 4–18 carbon atoms, the four carbon atoms linked with the nitrogen atoms forming two groups of two vicinal carbon atoms, $R_1$, $R_2$, $R_3$, $R_4$ and $R_5$ are monovalent hydrocarbon radicals, each containing 1–18 carbon atoms, $Z_1$ and $Z_2$ are CONH or NHCO groups, $Ar_1$, $Ar_2$ and $A_3$ are each selected from the same group as $Y_1$ and $n$ is zero or an integer from 1 to 3, the amount of reactants employed being from 0.1 to 8 moles of diamine and a total of 2.2 to 20 equivalents of ester groups per 1 mole of tetraamine.

7. A thermostable nitrogen containing resin prepared by reacting a diester having the formula $$R_1OOC-Y_1-COOR_2$$

and (2) a triester having the formula $$R_3OOC-Y_2-COOR_4$$
$$\phantom{R_3OOC-Y_2-}|$$
$$\phantom{R_3OOC-Y_2-}COOR_5$$

with (3) a diamine having the formula $$H_2N-Y_3-NH_2$$

or $$H_2N-Ar_1-Z_1(Ar_3-Z_2)_nAr_2-NH_2$$

and (4) a tetraamine having the formula $$\begin{array}{c} H_2N \quad\quad NH_2 \\ \diagdown \;\; \diagup \\ X_1 \\ \diagup \;\; \diagdown \\ H_2N \quad\quad NH_2 \end{array}$$

wherein $Y_1$ is an aromatic carbocyclic divalent radical containing 4–18 carbon atoms, $Y_2$ is an aromatic carbocyclic trivalent radical containing 4–24 carbon atoms, $Y_3$ is selected from the same group as $Y_1$, $X_1$ is a tetravalent aromatic carbocyclic radical containing 4–18 carbon atoms, the four carbon atoms linked with the nitrogen atoms forming two groups of two vicinal carbon atoms, $R_1$, $R_2$, $R_3$, $R_4$ and $R_5$ are monovalent hydrocarbon radicals, each containing 1–18 carbon atoms, $Z_1$ and $Z_2$ are CONH or NHCO groups, $Ar_1$, $Ar_2$ and $Ar_3$ are each selected from the same group as Y and $n$ is zero or an integer from 1 to 3, at a temperature between 100° C. and 300° C., the amount of reactants employed being from 0.1 to 8 moles of diamine and a total of 2.2 to 20 equivalents of ester groups per 1 mole of tetraamine.

8. A thermostable nitrogen compound as recited in claim 7, wherein said diester is phenyl isophthalate, said triester is phenyl trimesate, said diamine is 3,3′-diaminobenzanilide and said tetraamine is 3-3′ diaminobenzidine.

9. A thermostable nitrogen compound as recited in claim 7, wherein said diester is phenyl isophthalate, said triester is phenyl trimesate, said diamine is metaphenylenediamine, and said tetraamine is 3,3′-diaminobenzidine.

10. A thermostable nitrogen compound as recited in claim 7, wherein said diester is phenyl isophthalate, said triester is phenyl trimesate, said diamine is 4,3′-diaminobenzanilide and said tetraamine is 3-3′ diaminobenzidine.

11. A thermostable nitrogen compound as recited in claim 7, wherein said diester is a mixture of phenyl isophthalate and phenyl terephthalate, said triester is phenyl trimesate, said diamine is 3,3′-diaminobenzanilide and said tetraamine is 3-3′ diaminobenzidine.

12. A thermostable nitrogen compound as recited in claim 7, wherein said diester is phenyl isophthalate, said triester is a mixture of 1,3,5-triphenylbenzene tri(phenyl carboxylate) and phenyl trimesate, said diamine is 3,3′-diaminobenzanilide and said tetraamine is 3-3′ diaminobenzidine.

13. A thermostable nitrogen compound as recited in claim 7, wherein said diester is phenyl isophthalate, said triester is phenyl trimesate, said diamine is N,N′-bis(3-aminophenyl)isophthalamide and said tetraamine is 3-3′ diaminobenzidine.

14. A thermostable nitrogen compound as recited in claim 7, wherein said diester is phenyl isophthalate, said triester is phenyl trimesate, said diamine is 4,4′-diaminodiphenylether and said tetraamine is 3-3′ diaminobenzidine.

15. A thermostable nitrogen compound as recited in claim 7, wherein said diester is phenyl isophthalate, said triester is phenyl trimesate, said diamine is a mixture of 3,3′ - diaminobenzanilide and N,N′-bis(3′-amino-3-benzamidophenyl)isophthalamide, and said tetraamine is 3-3′ diaminobenzidine.

References Cited

UNITED STATES PATENTS

| | | | |
|---|---|---|---|
| 3,179,614 | 4/1965 | Edwards | 260—78 |
| 3,247,165 | 4/1966 | Rodia | 260—78 |
| 3,336,258 | 8/1967 | Angelo et al. | 260—78 |
| 3,354,125 | 11/1967 | Smith et al. | 260—78 |
| 3,387,058 | 6/1968 | Levine | 260—78 |

HAROLD D. ANDERSON, Primary Examiner

U.S. Cl. X.R.

260—65, 78, 78.4, 30.8, 30.2, 45.95; 117—124, 161; 161—197, 227